(No Model.)
C. M. BLYDENBURGH.
VEHICLE BODY.
No. 413,017. Patented Oct. 15, 1889.
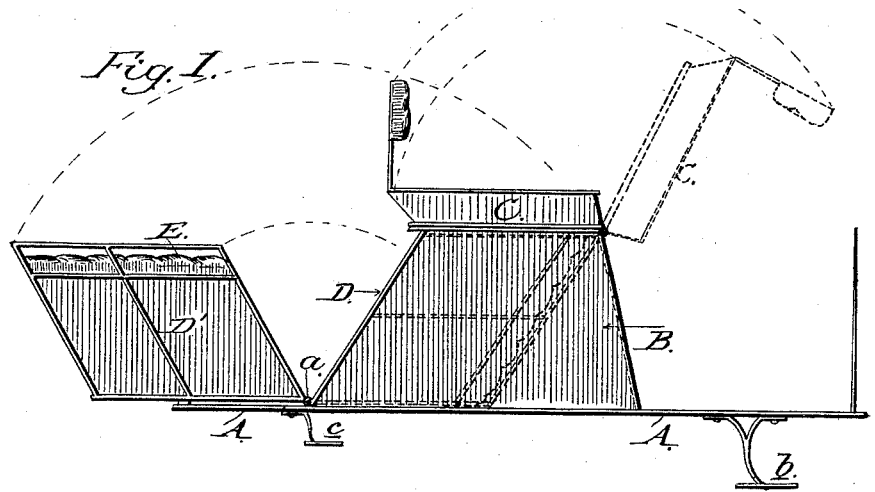
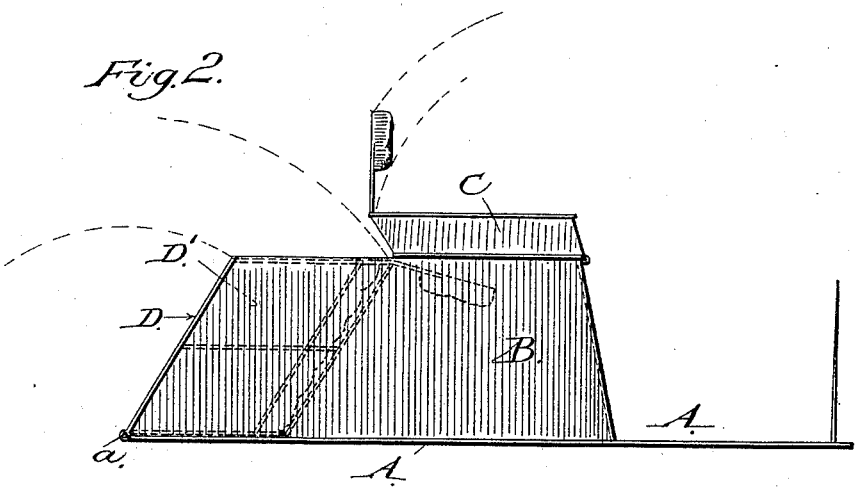
WITNESSES
T. W. Fowler,
W. H. Patterson
INVENTOR
Charles M. Blydenburgh,
by A. H. Evans & Co
his Attorneys

UNITED STATES PATENT OFFICE.

CHARLES M. BLYDENBURGH, OF RIVERHEAD, NEW YORK.

VEHICLE-BODY.

SPECIFICATION forming part of Letters Patent No. 413,017, dated October 15, 1889.

Application filed August 5, 1889. Serial No. 319,733. (No model.)

*To all whom it may concern:*

Be it known that I, CHARLES M. BLYDENBURGH, a citizen of the United States, residing at Riverhead, in the county of Suffolk and State of New York, have invented certain new and useful Improvements in Vehicles, of which the following is a full and clear description, reference being had to the accompanying drawings, forming part of this specification, in which—

Figure 1 represents a side view of a vehicle-body and front seat and showing the rear seat in position for use. Fig. 2 is a side elevation showing a modified form of front box or frame with the rear seat folded forward into the same.

My invention relates especially to that class of vehicles employing front and rear seats; and it consists in the constructions and combinations of devices, which I shall hereinafter fully describe and claim.

The object of my invention is to construct a vehicle that can be easily and quickly converted into a single or double seat vehicle, and when a single seat is used the rear seat is out of sight, its bottom forming the rear wall or end-gate of the vehicle.

In the said drawings, A represents the bottom or floor of any well-known style of vehicle; and B is a hollow frame or box secured thereto, and having hinged to the top of its front wall the front lower edge of the front seat C, which may be of any suitable shape, with or without a lazy-back, and upholstered or not, as the circumstances require. The back of the box is inclined, and at the bottom of the incline, where it joins the bottom A of the vehicle, is a hinge or joint *a* for the end-gate D, which forms the rear panel or wall of the hollow box when the vehicle is used as a one-seat vehicle, as in dotted lines in Fig. 1. The end-gate or rear panel D carries a frame or box D', whose configuration approximates that of the box or frame B, within which it is adapted to be folded, and said box or frame D' is formed with a seat portion E, of any appropriate and desired style. From this description it will be seen that when the vehicle is to be used with one seat the rear box or frame D is folded into the open rear end of the front box, the front seat being lifted forward into the dotted position in Fig. 1, to permit the entrance of the rear box and its seat. In this case the bottom of the box or frame A becomes the rear panel or end-gate of the vehicle, and by closing the open rear end of the front box protects the rear seat from dust and weather.

The vehicle may be readily converted from a single-seat vehicle to one having two seats by simply raising the front seat on its hinge or pivot and then turning the rear box backward on its hinge or pivot until the end panel or gate D assumes a horizontal position, when the rear seat will be in its proper position to be occupied. When the rear seat is used, the bottom of the vehicle may be extended rearwardly to provide a support for the rear box or frame, or the same may be suspended by chains or other securing means. At the front of the bottom A is a step *b* for the front seat, and at or near the rear end of the front box or frame is a step *c*, by which the occupants of the rear seat may step in and out without difficulty, and when occupying said seat their feet may enter the rear open end of the front box. The rear seat, or its frame or box, needs no adjusting, and the bottom thereof may be paneled or otherwise finished to give to the rear of the front box a finished appearance when the rear seat is not in use, and the bottom thereof serves as a panel or end-gate for the front box.

Having thus described my invention, what I claim as new, and desire to secure by Letters Patent, is—

1. In a vehicle, the hollow front box or frame and a front seat hinged to the front wall thereof and adapted to be turned forward, in combination with a rear box or frame hinged to the rear of said front box, and having a seat supported thereon, said box or frame being adapted to fold forward into the rear open end of the front box, whereby the bottom of said rear box becomes the end-gate or rear panel of the front box or frame, substantially as described.

2. In a vehicle, the bottom thereof having a rearward extension, a front box or frame having a hinged seat thereon, and a hinged end-gate adapted to fold into and to close the rear open end of the front box, said end-gate forming a part of a rear box or frame and having a cushioned seat, substantially as described.

CHARLES M. BLYDENBURGH.

Witnesses:
 JNO. M. CAMPBELL,
 JOHN BAGSHALL.